United States Patent [19]

Salia-Munoz

[11] 4,452,516

[45] Jun. 5, 1984

[54] OPTICAL GRID

[76] Inventor: Miguel Salia-Munoz, 7a Privada de Azafran No. 14 Col., Granjas, Mexico

[21] Appl. No.: 341,019

[22] Filed: Jan. 20, 1982

[30] Foreign Application Priority Data

| | | | |
|---|---|---|---|
| Jan. 23, 1981 | [MX] | Mexico | 185667 |
| Apr. 14, 1981 | [MX] | Mexico | 186874 |
| Apr. 14, 1981 | [MX] | Mexico | 186875 |
| Apr. 23, 1981 | [MX] | Mexico | 186995 |

[51] Int. Cl.³ .............................................. G02C 7/16
[52] U.S. Cl. ...................................... 351/45; 350/448
[58] Field of Search ............................ 351/45, 46, 41; 350/448

[56] References Cited

U.S. PATENT DOCUMENTS 2,232,455  2/1941  Hebrard ................................ 351/46

Primary Examiner—John K. Corbin
Assistant Examiner—Rodney B. Bovernick
Attorney, Agent, or Firm—Darby & Darby

[57] ABSTRACT

An optical grid for correcting optical defects in either natural or artificial lenses comprises two perpendicularly arranged series of dark and opaque bars integrally connected to each other in order to form an integral network, all of said bars having a triangular cross section with the base of the triangle facing said lens and the vertex away from said lens, so as to form square openings in said grid having their smaller areas facing said lens and their larger areas away from said lens, the ratio of said smaller areas to said larger areas being of from 1:36 to 1:2.25, preferably 1:4, said smaller area of each square opening being of from 0.04 to 4 mm², preferably 1 mm², and said bars being 1 mm wide.

In order to provide more luminosity, the grid is externally coated with a mirror-type reflecting coating or two large rectangular windows are provided laterally and away from the line of vision of said lens. In order to provide additional chromatic perception, a reflecting but matte coating is internally applied to the grid.

10 Claims, 8 Drawing Figures

OPTICAL GRID

FIELD OF THE INVENTION

The present invention refers to an improved optical grid useful for correcting optical aberrations, with increased image perception capacity and, more particularly, it is related to an optical grid capable of correcting optical aberrations both in connection with natural lenses such as the eye and artificial lenses such as photographic lenses and the like which, by the appropriate sizing of its openings, furnishes an increased image perception capacity.

BACKGROUND OF THE INVENTION

In the optical arts various systems for correcting the optical aberrations shown both by natural lenses such as the human eye and by artificial lenses such as photographic lenses and the like, are very well known. However, such systems generally comprise the superposition, to the defective lens, of an additional lens or of a series of additional lenses suitably designed and calculated to the effect that, by means of the joint and complementary action of said lenses with the defective lens, the defects presented by the latter by corrected.

Thus, according to the traditional optical arts, spherical aberrations of lenses are corrected by means of the addition of various elements that jointly refract the light such that the same will be directed in the adequate directions in order to avoid sphericity of the images projected or observed through said lenses. The aberrations of the chromatic type, also, are normally corrected by the superposition of lenses correcting the polychromatic refraction caused by the prisms constituted particularly at the peripheries of common lenses or in the lenses having a small curvature radius.

Other type of aberrations, known as astigmatism, farsightedness or presbyopsia, myopic astigmatism and the like, also constituting common diseases of the human eye, are corrected in accordance with the prior art, by means of lenses suitably designed to compensate the deficient refraction of the light rays produced by defects either in the cornea or in the crystalline of the eye.

One other known method of correcting said aberrations, is to provide a relatively large lens partially covered by a diaphragm which masks a large proportion of the peripheral area of said lens and leaves as the only useful part thereof just a small area at the center of the lens, wherein the parallelism of the faces is greater and therefore the formation of peripheral prisms is suitable masked.

However, the first above mentioned technique of adding correcting lenses is highly costly and requires very accurate calculations, whereby the correcting lenses normally result of a high price and, in the second of the above mentioned techniques, the said techniques may be considered as a very primitive remedy to the problem, which does not take advantage of the major part of the area of the lens and does not correct, but only avoids the utilization of the more critical areas of said lens, whereby said prior art techniques of correcting optical aberrations, have left much to desire.

One other method of partially correcting optical aberrations are the non-refracting devices such as the so called stenopeic spectacles which have been known as a visual aid from early times. For instance, in the text book System of Ophthalmology, by Sir Steward Duke-Elder and David Abrams, edited by Sir Stewart Duke-Elder, Volume V, pages 794 et seq, it is very clearly mentioned that said stenopeic spectacles where advocated and their optical principles explained by Daza de Valdés in 1623, and were first employed clinically by the French ophthalmologists Serre in 1857 and Frans Donders in 1864. However, as also clearly stated in said text book, the main disadvantage of a stenopeic hole is that it provides a very small visual field and, since it does not move with the eye, it is of little advantage to the wearer when walking about. It is also mentioned in said text book that when it is required for general purposes a disc composed of several such openings bored in a sheet of opaque material may prove "better than nothing", which means that said stenopeic spectacles have proven to be highly inefficient articles and, as is also well known and mentioned and described in many optics books, a stenopeic hole has as its sole purpose to avoid the entrance into the defective eye or lens of the diffraction circles that generally accompany pure light rays, whereby said stenopeic holes must be obviously of circular shape, and as Duke-Elder et al very clearly mention in their text book, in order to be effective, the multiplicity of stenopeic holes provided in spectacles, must be spaced in about 4 mm between each other, and must have a size of about 1.5 mm for distant vision and 0.3 mm for near vision.

The fact that the stenopeic holes have as their only purpose to prevent the entrance of the diffraction circles, whereby their form must be obviously circular, and the fact that the spacement thereof must be relatively large in stenopeic spectacles, render said stenopeic spectacles as highly impractical devices for general use, inasmuch as the effort of the wearer is not compensated by the benefit produced by the improvement of the image perception, and thus said stenopeic spectacles have not gained throughout such a long time any acceptance among the general public, regardless of the fact that many persons may be in real need of something more than mere spectacles or mere contact lenses to improve their vision. The problems encountered with the decrease in the perception of light intensity and vision angle with the stenopeic holes, is of considerable importance and has been determinant of the lack of acceptance for these devices among the public.

The stenopeic spectacles were improved by Guthrie, who provided a surface covered by stenopeic holes of the size and with the spacement mentioned above, with an additional centrally arranged so called stenopeic slit, in order to increase vision at least when reading, but the stenopeic, slit may be regarded as highly inefficient for many particular purposes, and more particularly when the defects in the eye to which the said stenopeic slit is superposed, include aberrations of the spherical type and more particularly astigmatism.

In Mexican Pat. No. 132,553 patented Feb. 10, 1976 to the same applicant hereof, an optical grid is described for causing interference of light rays and which to a great extent remedied the defects of the devices of the above described techniques, including the stenopeic spectacles.

Said grids were designed for application to spectacles and comprised an undetermined number of square openings, said grids being either flat or concave to be adapted to the rings of ophthalmic frames for spectacles with conventional glasses and/or in substitution thereof.

Even when the optical grid of Mexican Pat. No. 132,553 is very efficient to correct optical aberrations particularly caused by the excess of luminosity, by means of a process of light interference effected through the plurality of square holes that it contains, said grid does not provide any usefulness in the correction of optical aberrations of other types and, of course, said optical grid is mainly based in the decrease of the light intensity by means of said interference, thus causing obscurity or lower intensity of the light detected, with a better perception of the images. However, the considerable decrease of luminosity produced by the grids of Mexican Pat. No. 132,553 is in itself an inconvenience, in view of the fact that particularly in dark places or in the twilight time of the day, as well as in the darkness of the night, the use of said grids causes a loss of visual intensity which is not compensated by the improvement of the image perception, and this may cause the loss of perception of many dark objects.

The principle of providing square holes uniformly spaced from each other, however, as described in said Mexican Pat. No. 132,553, for the first time changes the concept of using stenopeic holes for trying to improve visual perception, and may be regarded as a considerable improvement in the art of correcting optical aberrations of lenses. However, this grid was very primitive and may be regarded as a first effort of applicant to provide a practical device that could be used in substitution of glasses for spectacles, without the loss of light intensity and however with a high improvement in the image perception and an absolute correction of optical aberrations as will be described in the instant application.

Therefore, with the exception of the optical grid described and claimed by applicant in Mexican Pat. No. 132,553, which may be regarded as a considerable improvement over the prior art, all other prior art devices were absolutely impractical and, as very clearly described by Stewart Duke-Elder, may be regarded just as something which is "better than nothing".

BRIEF SUMMARY OF THE INVENTION

Having in mind the defects of the prior art correcting devices for optical aberrations, it is an object of the present invention to provide an optical grid which will be of a very simple and economical construction and yet capable of correcting optical aberrations both in natural lenses such as the human eye and in artificial lenses such as photographic lenses and the like, at the same time considerably increasing the image perception and the image clarity.

One other object of the present invention is to provide an optical grid of the above mentioned character, which will not cause considerable decrease in luminosity and will permit the perception of objects even in relatively dark places, with the profiles highly improved and clear.

A more particular object of the present invention is to provide an optical grid of the above mentioned character, which by very simple means will be capable of correcting optical aberrations without appreciable loss of luminosity and a higher precision of the perceived objects.

One other object of the present invention is to provide an optical grid of the above mentioned nature, which by very simple means will be capable of considerably increasing the intensity of the light detected by the prior art optical grids.

One other object of the present invention is to provide an optical grid of the above mentioned character, which by very simple means will furnish a considerably improved chromatic perception of the images.

BRIEF DESCRIPTION OF THE DRAWINGS

The novel features that I consider characteristic of my invention are set forth with particularly in the appended claims. The invention itself, however, both as to its organization and its method of operation, together with additional objects and advantages thereof, will best be understood from the following description of specific embodiments, when read in connection with the accompanying drawings, in which:

DETAILED DESCRIPTION

Figures 1, 2:
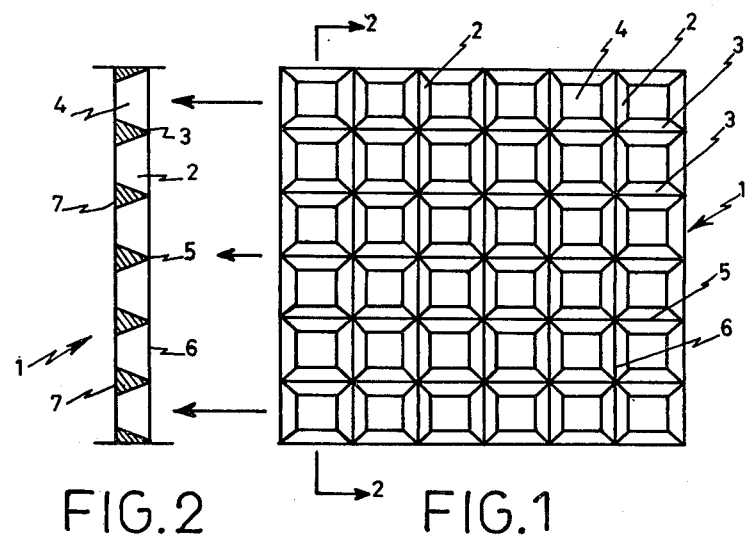
FIG. 1 is a fragmentary front elevational view of an optical grid built in accordance with an embodiment of the present invention.
FIG. 2 is a cross sectional elevational view of the optical grid, taken along lines 2—2 of FIG. 1 and looking in the direction of the arrows.

Having now more particular reference to the drawings and more specifically to FIGS. 1 and 2 thereof, there is shown an optical grid for correcting optical aberrations, built in accordance with a first embodiment of the present invention and illustrated by means of the general reference numeral 1, which comprises a plurality of bars 2 having a triangular cross section, and arranged parallel to each other, and a plurality of bars 3 also of triangular cross section and also arranged parallel to each other, but in a perpendicular relationship with respect to bars 2, such that the two series of bars 2 and 3 form a grid leaving square shaped openings 4, in order to permit the passage of light.

The bases 7 of bars 2 and 3 are arranged towards the inner side of the grid, that is, on the face which will be directly confronted with the lens the aberrations of which are to be corrected, whereas apexes 5 and 6 of bars 2 and 3 are directed towards the outer face of the grid, that is, the face where the light falls as shown by means of the arrows in FIG. 2.

Therefore, the openings 4 through which the light passes through the grid are square shaped openings constituted by the smaller bases of the spans left between bars 2 and 3, said openings being of frustopyramidal square shape, with their larger bases towards the outer face and their smaller bases towards the inner face of the grid.

In order to accomplish a suitable removal of the undesirable light waves by interference, and so as to suitably correct the aberrations of the lens to which the optical grid of the present invention is associated, together with the supply of an improved image perception, it has been found that the smaller area of openings 4 must be related to the larger area of said openings by a ratio of from 1:36 to 1:2.25, preferably of 1:4, inasmuch as it has been experimentally determined that said range of area relationship is the one producing the optimal results, particularly in connection with the best clarity and definition of perception of the observed objects, accompanied by an absolute correction of spherical, astigmatic and chromatic aberrations, provided that the total area of each opening 4 at its smaller base, be of between approximately 0.2 mm and 2 mm on each side, that is, of from 0.04 to 4 mm$^2$, and that the width of said bars be of about 1 mm.

While the accurate nature of the physical interpretation of the phenomenon occurring in the optical grid in accordance with the present invention is not fully understood, it is a true experimentally determined fact that the provision of the frustopyramidal openings with their smaller bases directed towards the inner face of the grid and their larger bases directed towards the outer face of the grid, and with said openings dimensioned such that the smaller areas thereof, as compared to the larger areas will be in a relationship of from 1:36 to 1:2.25; with the smaller areas of approximately from 0.04 to 4 mm$^2$, and with a width of the bars of 1 mm, the correction of optical aberrations that it was not possible to correct with the prior art devices, including the grid of Mexican Pat. No. 132,553, is surprisingly accomplished. On the other hand, the lower the ratio of the smaller to the larger area, the better the clarity of the image perceived.

Figure 3:
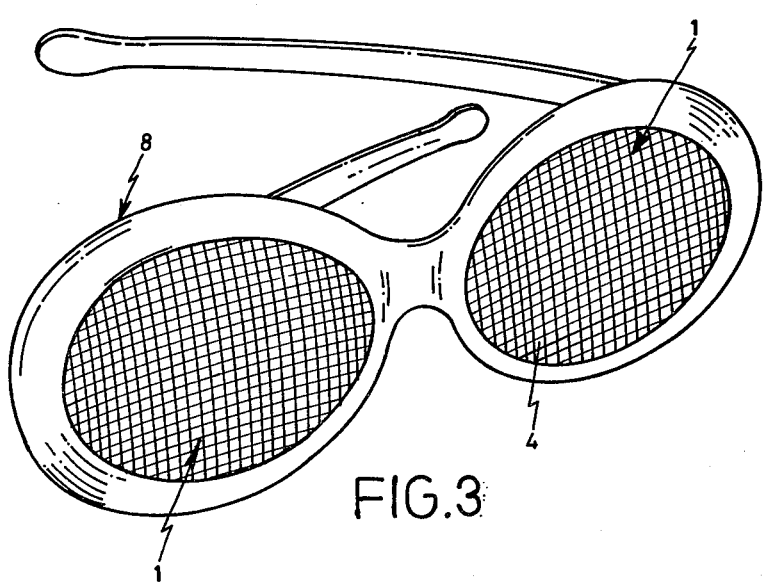
FIG. 3 is a perspective view of a particular example of application of the grid of the present invention in optical spectacles.
Figure 4:
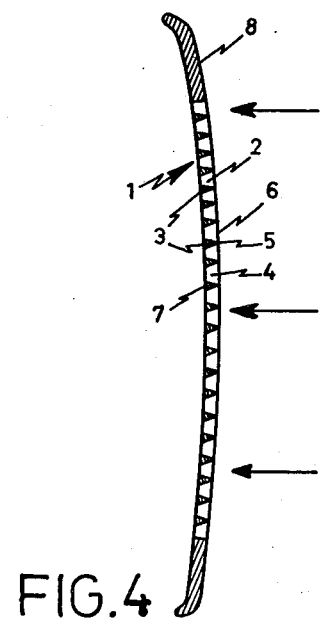
FIG. 4 is a cross sectional elevational view of the structure of the grid and spectacles illustrated in FIG. 3, in order to show the construction thereof.

FIGS. 3 and 4 of the drawings show a particular application of the optical grid built in accordance with the present invention, by the arrangement of said grids 1, of a concave constitution, within the rings of an ophthalmic frame 8, in order to constitute spectacles for correcting visual defects such as low chromatic perception, astigmatism, farsightedness and other ocular diseases derived from sphericity of the cornea and focusing defects of the crystalline.

Figure 5:
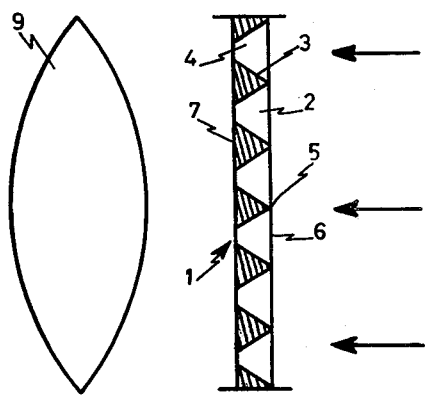
FIG. 5 is a cross sectional elevational view of a second particular example of application of the optical grid of the present invention, in combination with a photographic meniscus type lens.

On the other hand, FIG. 5 of the drawings shows the optical grid of the present invention as used in association with a photographic meniscus type lens 9, such as those commonly used in low priced photographic cameras. The grid of the present invention, when used in combination with such lenses, furnishes a considerable improvement of said lens in connection with the spherical aberration which is normal in this type of meniscus 9, as well as the chromatic aberration particularly produced at the periphery of said lens, whereby the lens producing industry will be enabled to effect a practical utilization of a larger opening of the lens, which constitutes a considerable advance in the art, inasmuch as for this type of meniscus lenses, which as mentioned above, are used generally for low priced photographic cameras it is indispensable, in accordance with the prior art, to mask by means of a diaphragm the larger part of the useful area of the lens, in order to use only the center thereof, as the only means to decrease such aberration. The optical grid of the present invention, given its correcting capacity against said aberrations and its increased image perception capacity, will enable the production of meniscus lenses having much larger openings without however producing the well known aberrations generally produced by this type of meniscus lenses.

Figure 6:
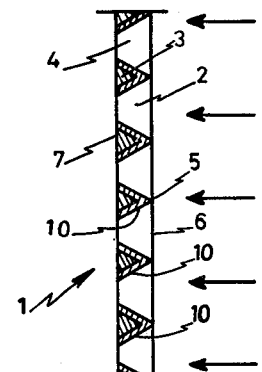
FIG. 6 is a cross sectional elevational view of an optical grid built in accordance with a second embodiment of the present invention.

FIG. 6 of the drawings shows a cross sectional elevational view, of a fragment of an optical grid built in accordance with a second embodiment of the invention, in which the outer face of the grid is coated with a coating 10, which is illustrated in an exaggerated manner in FIG. 6 of the drawings, and comprising a layer of a light reflecting material, such as a metallized layer or a mirror type layer, which serves for considerable increasing the luminosity of the grid of the present invention, as compared to a grid not containing the said coating 10. The provision of this mirror type reflecting coating on the outer face of the grid, surprisingly, particularly when using said grid for spectacles, furnishes a considerable increase in the luminosity perception of the user, with the consequent advantages that said light perception increase provides, inasmuch as it is possible to use spectacles having an optical grid in accordance with this embodiment of the invention, and it is also possible to use the grid of this second embodiment of the invention in association with photographic lenses, in places which might be darker than those in which the grid in accordance with the prior art may be used.

The reason why the reflecting coating 10 provided on the outer free of the optical grid built in accordance with FIG. 6 of the drawings provides an increase in the light perception is not clearly understood, because said reflecting layer is not "visible" to the lens with which the optical grid is associated, but it has been experimentally determined that the said increase in luminosity indeed occurs, particularly when using said optical grid in spectacles for correcting visual defects of an individual.

Figure 7:
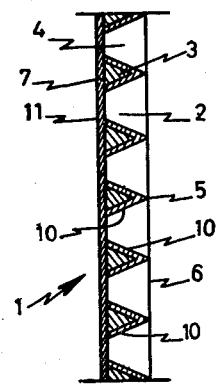
FIG. 7 is a cross sectional elevational view of an optical grid built in accordance with still a further embodiment of the present invention.

FIG. 7 of the drawings shows still another or third embodiment of an optical grid built in accordance with the present invention, which is similar to the grid illustrated in FIG. 6 of the drawings, but for the fact that the inner face of the grid is provided with a coating 11 of a light reflecting material which is not bright but is rather of a matte nature, in order to avoid eddy reflections towards the lens with which the optical grid of the present invention is associated. This coating, surprisingly, provides a remarkable increase in the color perception of the images. Said coating 11 is preferably a matte metallic coating, particularly a matte silver coating, such as of the alpaste type. It is also absolutely surprising that the provision on the inner face of the optical grid in accordance with the present invention, of a matte coating 11, which is light reflecting, may in itself provide a remarkable increase in the chromatic perception of the lens with which the grid of the present invention is associated.

The reasons of this effect are also not understood, but it has been experimentally determined that this increase in the chromatic perception of the lenses indeed occurs, whereby when the optical grid is to be used, for instance, for color photography or for watching color television, in association with grid spectacles, this is a preferred embodiment of the invention to be used for said particular applications.

Figure 8:
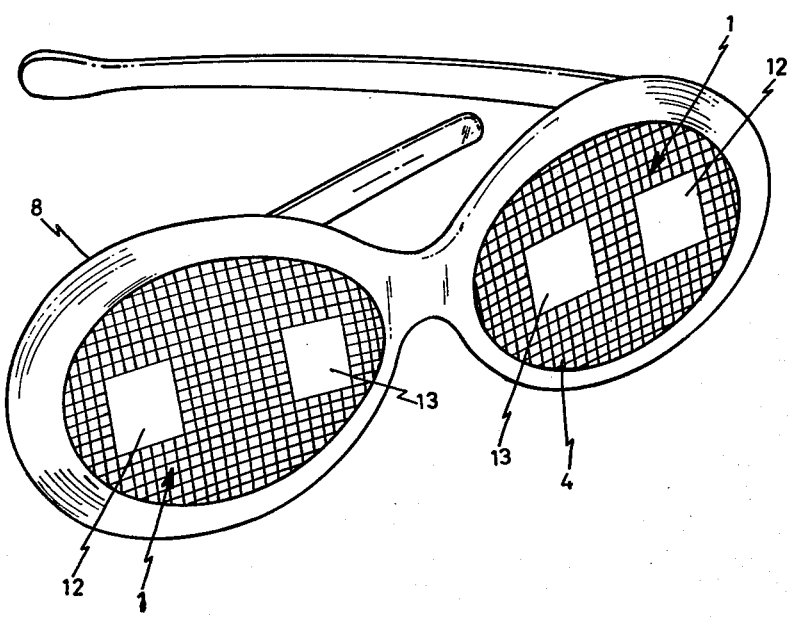
FIG. 8 is a perspective view of a third particular example of application of the optical grid of the present invention, showing devices for increasing the luminosity thereof.

Finally, FIG. 8 of the drawings shows a further embodiment of the present invention, which is particularly useful when the optical grid of the present invention is applied to spectacles, because said embodiment of the invention provides an impression of a considerable increase in the luminosity of the grid, when said grid is applied to spectacles to be used by the human being.

In accordance with this particular embodiment of the invention, each one of the grids 1 which are placed in the rings of the frame of the spectacles built in accordance with the present invention, is provided with two side windows 12 and 13, of a rectangular nature, inasmuch as it has been experimentally determined that said side windows 12 and 13, considerably increase the luminosity of the optical grid of the present invention, as compared to an optical grid not containing said windows 12 and 13. In this particular embodiment of the invention, the two faces of the grid are preferably black or at least of a very dark color in order to avoid any reflections towards the eyes the defects of which are to be corrected. The above mentioned two windows are placed particularly on the two sides of each grid of the present invention included in the spectacles for each eye of the wearer, and outside of the precision vision field of said wearer, whereby the user will always look through the intermediate area between the two windows 12 and 13, and will therefore look always through the optical grid, whereby his optical defects will be fully corrected, but with a considerable increase in apparent luminosity provided by said two side windows.

From the above it will be clearly seen that for the first time an optical aid has been provided for correcting optical defects of the human eye or for correcting certain optical aberrations of artificial lenses such as photographic lenses, through the use of a principle which is absolutely different from the principle of the stenopeic hole or of the stenopeic spectacles, inasmuch as for the first time a plurality of closely spaced square openings are provided in an optical grid, which permits the perception of a normal vision field, against the highly restricted vision field provided by the stenopeic holes which, even when used in a plurality thereof such as in stenopeic spectacles, do not provide an increased vision field, because the wearer is forced to look through just one single hole and must turn the head together with the spectacles to watch at the missing vision field, and the fact that the square holes of the optical grid in accordance with the present invention are of frustopyramidal square shape, provides a true and full removal of all the undesired eddy light rays which affect vision, whereby said grid is capable of correcting most of the optical defects of the human eye and most of the optical aberrations of an artificial lens, without considerably decreasing the luminosity perceived, which luminosity may be also increased by very simple means such as the light reflecting coating on the outer face of the grid or the pairs of windows aside the vision field.

Also, for the first time an optical grid has been provided that considerably improves the chromatic perception of lenses by the mere expedient of providing a matte but light reflecting coating on the inner face of the said grid.

However, what is considered to be the most important accomplishment of the instant invention is that for the first time, this optical aid may be efficiently used in grid spectacles, which do not decrease the field of vision of the individual and which however, correct most of the visual defects of the said individual without producing considerable undesirable defects other than the fact that the wearer must become used to having a grid in front of his eyes, which in accordance with tests effected with voluntary individuals, takes only a few hours.

Although I have shown and described certain specific embodiments of my invention, I am fully aware that many modifications thereof are possible. My invention, therefore, is not to be restricted except insofar as is necessitated by the prior art and by the spirit of the appended claims.

What is claimed is:

1. An optical grid useful for correcting optical aberrations, with an increased capacity of image perception and adapted to be applied both to the eye and to artificial lenses, which essentially comprises two series of bars of triangular cross section, arranged parallel to each other and with each series perpendicularly arranged with respect to the other series in order to form a grid leaving square free spaces therein, the apexes of said bars being directed toward the outer face of the grid, on which the light falls and the bases of said bars being directed towards the inner face of the grid which is directly confronted to the lens which defects are desired to correct, said square free spaces constituting openings of a square frustopyramidal shape, the larger base of which is at the outer face and the smaller base of which is at the inner face of the grid, the area of said larger base of the openings being in a ratio of from about 36:1 to 2.25:1 with respect to the area of the smaller base, the total area of the smaller base of each one of said square openings being of from about 0.04 to about 4 mm$^2$, and the width of said bars being of about 1 mm.

2. An optical grid according to claim 1 wherein the outer face of said grid is completely coated with a light reflecting coating, particularly a metallized or a mirror type coating, to increase the apparent luminosity through the grid.

3. An optical grid according to claim 2 wherein the total area of the inner face of said grid is coated with a matte but light reflecting coating, preferably a metallized alpaste type coating, in order to increase chromatic perception through said grid.

4. An optical grid according to claim 1 wherein said grid is flat.

5. An optical grid according to claim 1 wherein said grid is concave towards the lens.

6. An optical grid according to claim 2 wherein said grid is concave towards the lens.

7. An optical grid according to claim 3 wherein said grid is concave towards the lens.

8. An optical grid according to claim 5 wherein said grid is used in combination with the rings of an ophthalmic frame for forming spectacles, each one of said grids containing two lateral large rectangular openings located outside of the precision vision field of the wearer in order to increase luminosity of said spectacles.

9. An optical grid according to claim 6 wherein said grid is used in combination with the rings of an ophthalmic frame in order to form spectacles.

10. An optical grid according to claim 7 wherein said grid is used in combination with the rings of an ophthalmic frame in order to form spectacles.

* * * * *